Patented Oct. 2, 1928.

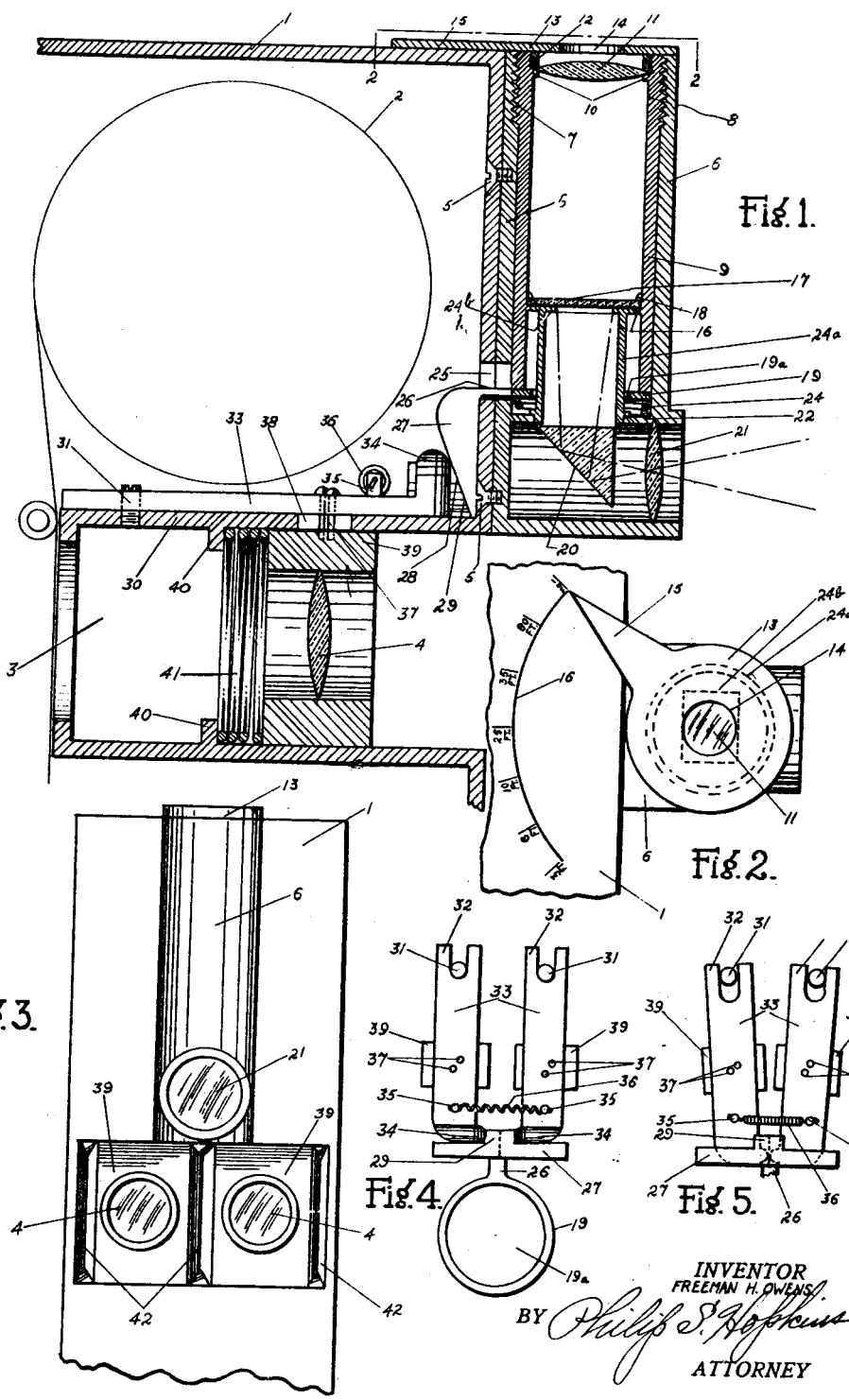

1,686,463

UNITED STATES PATENT OFFICE.

FREEMAN H. OWENS, OF NEW YORK, N. Y.

FOCUSING DEVICE FOR CAMERAS.

Application filed August 25, 1926. Serial No. 131,394.

My invention has particular reference to a photographic camera provided with two lenses for taking separate views on separate negatives, also for taking separate views on the same negative, or for taking double views on a single or double negative as desired. Such cameras are particularly useful in the motion picture art wherein it is desired to take consecutive views alternately on separate films running within the camera. Obviously, the same values attach to my invention when used in stereoscopic cameras, or in taking and projecting color work on photographic film.

The primary object of my invention is to provide a distinctly novel type of focusing device for cameras.

Another object is to provide a combined view finder and focusing device.

Still another object is to provide for the simultaneous focusing and lateral adjustment of the lenses in a double lens camera.

A further object lies in the provision of a novel double wedge member operated by the focusing lever for accomplishing such simultaneous control.

Other objects and advantages will appear as the description proceeds, reference being had to the accompanying drawing wherein like reference numerals indicate like parts.

In the drawing:—

Figure 1 is a vertical sectional view of a portion of a photographic camera showing clearly the operation of my focusing device.

Figure 2 is a detail plan view taken on the line 2—2 of Figure 1.

Figure 3 is a front elevation of a portion of the camera.

Figures 4 and 5 are detail plan views illustrating the operation of the focusing wedge.

Reference numeral 1 indicates the upper front body portion of a photographic camera, in which film reels 2, one of which is shown in dotted lines in Figure 1, may be mounted in any desired manner. It will be noted that the body of the camera 1 is recessed as at 3 to provide a protected space for the lenses 4 which are thus shaded from sun glare and protected from dust and dirt.

Secured to the front of the camera body 1 directly above the recess 3, as by screws or other suitable means 5, is a housing 6 internally screw threaded at its upper end as at 7 to receive the upper threaded end 8 of a focusing barrel 9 rotatable and slidable within the housing 6. The barrel 9 is provided adjacent its upper end with internal shoulders 10 on which is seated a magnifying lens 11 held in position on the shoulders 10 by means of the downwardly extending ring 12 screw threaded or otherwise secured tightly to the barrel 6. The ring 12 is carried by and is preferably integral with a cap member 13 provided with a cut out portion or diaphragm 14 directly over the lens 11, and with a pointer finger 15 extending over the upper surface of the camera body 1. A suitable scale 16 is provided on the top of the camera 1 for cooperation with the pointer 15.

Adjacent the lower end of the barrel 9 is provided the shoulder 16 on which is seated a ground glass 17 secured in position by the ring 18 or any other means desired. The bottom of the barrel 9 is open and lies directly over a washer or follower 19, provided with an opening 19ª through which a prism, mirror or other reflecting surface 20, suitably fixed in the lower end of the housing 6, is visible. A finder lens 21 is suitably mounted in the front of this lower portion of the housing 6 and through this lens 21 the image to be viewed passes to the reflected surface 20 and thence upwardly to the ground glass 17 where it is visible through the opening 14 and magnifying lens 11.

A shoulder 22 is provided within the lower end of the housing 6 directly above the mirror 20 and lens 21 and between this shoulder and the washer 19 is a coil spring 24 normally urging the washer 19 upwardly. A masking tube 24ª is suitably secured at its lower end to the shoulder 22, extending upwardly through the aperture 19ª in the follower 19, to the ground glass 17. At its upper end this tube is provided with inwardly extending flanges 24ᵇ forming a mask for the image formed on the ground glass.

A recess 25 is provided through the wall 6 of the housing and the front wall of the camera, through which recess projects an extension 26 carried by the washer or follower. This extension 26 has depending therefrom a double wedge member comprising the portion 27 with the inclined surface 28 and the laterally extending wedge portion 29 relatively wide at its top and tapered down on either side to a point at the bottom as illustrated in Figures 4 and 5. The function of this wedge will be described later.

The top wall 30 of the recessed portion 3 of the camera is provided with two fixed upstanding pins 31 with which are engaged the bifurcated ends 32 of levers 33 provided at their opposite ends with rounded upturned fingers 34 lying in a position for cooperation with the wedges 27 and 29. Upstanding lugs 35 on each lever 33 provide anchor means for a coil spring 36 extending between the levers 33 and normally pulling the ends of the levers having the rounded fingers 34 towards each other. The levers 33 are also provided with pins or other suitable means 37 extending downwardly through recesses 38 in the wall 30 and secured at their lower ends to suitable frames 39 within which are mounted the camera lenses 4. It will be understood that the frames 39 are slidable within the recess 3, such sliding movement being limited only by the size of the recesses 38 in the wall 30. The levers 33 are of such width as to permit the maximum amount of sliding movement either pivotal or longitudinal without uncovering the recesses 38.

Shoulders 40 are provided within the recess 3 between which shoulders and the frames 39 are mounted coil springs 41, one of which is clearly shown in Figure 1. This spring 41 normally urges the frame 39 carrying the lens 4 outwardly, and the tension thereof against the frame 39 serves to hold the frame in any adjusted position.

It will be understood that in a double lens camera of this character, it is necessary not only to focus the lenses longitudinally toward and away from the objects to be photographed, for distance, but also to move the lenses toward or away from each other pivotally in accordance with the distance of the camera from the object. As shown in Figure 3, bellows members 42 are provided between the lenses and adjacent portions of the camera, thus locking out all light except that passing the lenses.

The operation of my improved simultaneous control for the longitudinal and pivotal adjustment of the taking lenses for proper focus, as combined with the view finder is as follows:—

The pointer 15 is turned by the operator, thus rotating the barrel 9, which due to the threaded connection at its upper end with the housing 6, raises or lowers depending upon the direction of the movement of the pointer 15. The operator by watching the image on the ground glass 17, through the opening 14, can thus observe the point at which the image is sharp and the correct focus obtained. As the barrel 9 moves up or down, the wedge member 27 moves therewith with the inclined edge 28 thereof in engagement with the rounded fingers 34 of the levers 33. It will be understood, therefore, that if the wedge 27 is moved upwardly, the coil spring 41 through the means of frame 29 and pins 37 will force the levers 33 longitudinally forward, whereas as the wedge member 27 is lowered, its inclined edge 28 will force the levers 33 longitudinally backward against the tension of the spring 41, thus providing for the adjustment necessary for focusing the lens 4 for distance. At the same time, this operation takes place, the wedge member 29 engaged between the rounded fingers 34 of the levers 33 cooperates with the coil spring 36 to rock the levers 33 on their pivots 31 and thus adjust the frames 39, carrying the lenses 4 laterally. If the wedge member 29 is raised, the spring 36 tends to draw the levers 33 together with the rounded fingers 34 riding against the downwardly inclined faces of the wedge 29. If such wedge is lowered, the inclined face thereof tend to force the fingers 34 outwardly against the tension of the spring 36. The proportionate movement of the lenses 4 pivotally and horizontally is a matter carefully calculated and provided for in inclined faces of the wedges 27 and 29, so as to conform properly to the movement of the ground glass in the finder.

The operator therefore by merely bringing the ground glass in the view finder to proper focus, not only simultaneously focuses the camera lenses, but is able to observe the image to be photographed at all times.

Of course many changes may be made in details of construction and operation without departing from the spirit and scope of my invention. I do not limit myself, therefore, to the exact form shown and described other than by the appended claims.

I claim:—

1. A focusing device for cameras comprising a view finder provided with a ground glass and a lens, a camera lens, said finder being movable to focus, and means co-operating with said finder and said camera lens whereby the camera lens is focused upon movement of said finder to proper focus on said ground glass.

2. A focusing device for cameras comprising a view finder provided with a movable part, a ground glass carried by said movable part, a stationary finder lens for directing an image to said ground glass for focusing, a camera lens, and means cooperating with said movable part and said camera lens whereby the latter is focused upon movement of said movable part, in accordance with the focus on said ground glass.

3. A focusing device for cameras comprising a view finder provided with a movable part, a ground glass carried by said movable part, a stationary finder lens for directing an image to said ground glass for focusing, a tubular masking element between said ground glass and finder lens, a camera lens, and means cooperating with said movable part and said camera lens whereby the latter is focused upon movement of said movable part in accordance with the focus on said ground glass.

4. A focusing device for cameras comprising a view finder, part of which is movable, and a camera lens, and an element movable with said finder part and cooperating with said lens whereby the camera lens is focused upon movement of said finder part.

5. A focusing device for cameras comprising a view finder having a vertically movable barrel, a follower movable with said barrel, a camera lens, and an element carried by said follower and cooperating with said lens whereby said lens is focused upon movement of said barrel.

6. A focusing device for cameras comprising a view finder having a vertically movable barrel, a follower movable with said barrel, a camera lens, and an element carried by said follower and cooperating with said lens whereby said lens is focused upon movement of said barrel, and indicating means on said barrel for said focus.

7. A focusing device for cameras comprising a view finder having a rotatable and longitudinally movable barrel, a follower movable longitudinally with said barrel, a camera lens and slidable mount therefor, and an element carried by said follower cooperating with said lens mount whereby said lens is focused upon movement of said barrel.

8. A focusing device for cameras comprising a view finder having a rotatable and longitudinally movable barrel, a follower movable longitudinally with said barrel, a camera lens and movable mount therefor, a lever for moving said mount, and an element carried by said follower and provided with an inclined surface engaging said lever whereby to focus said lens when said barrel is moved.

9. A focusing device for cameras comprising a view finder, a part of which is movable, and two spaced camera lenses pivotally and longitudinally adjustable for focusing, and means movable with said movable part for simultaneously adjusting said lenses longitudinally and pivotally.

10. A focusing device for cameras comprising a view finder, a part of which is movable, and two spaced camera lenses, mounts for said lenses and levers secured to said mounts for pivotally and longitudinally adjusting said lenses for focusing, and an element movable with said movable part and engaging said levers for simultaneously adjusting said lenses longitudinally and pivotally.

11. A focusing device for cameras comprising a view finder, a part of which is movable, and two spaced camera lenses, mounts for said lenses and levers secured to said mounts for pivotally and longitudinally adjusting said lenses for focusing, and an element movable with said movable part and engaging said levers for simultaneously adjusting said lenses longitudinally and pivotally, and means normally forcing said levers into engagement with said element.

12. A focusing device for cameras comprising a movable element and two spaced camera lenses pivotally and longitudinally adjustable for focusing, and means cooperating with said lenses for simultaneously adjusting them pivotally and longitudinally upon movement of said element.

13. A focusing device for cameras comprising a view finder, a part of which is movable, and two spaced lenses pivotally and longitudinally adjustable for focusing, mounts for said lenses and levers secured thereto, a follower movable with said finder part and provided with means engaging said levers for simultaneously adjusting said lenses pivotally and longitudinally upon movement of said finder, said means including an element having inclined surfaces engaging said levers.

14. A focusing device for cameras comprising a view finder, a part of which is movable, and two spaced lenses pivotally and longitudinally adjustable for focusing, mounts for said lenses and levers secured thereto, a follower movable with said finder part and provided with means engaging said levers for simultaneously adjusting said lenses pivotally and longitudinally upon movement of said finder, said means including an element having inclined surfaces engaging said levers, and spring means normally forcing said levers into engagement with said inclined surfaces.

15. A focusing device for cameras comprising a view finder, a part of which is movable, and two spaced lenses pivotally and longitudinally adjustable for focusing, mounts for said lenses and levers secured thereto, a follower movable with said finder part and provided with means engaging said levers for simultaneously adjusting said lenses pivotally and longitudinally upon movement of said finder, said means including an element having inclined surfaces engaging said levers, and spring means normally forcing said levers into engagement with said inclined surfaces, said levers being rounded at the points of engagement with said surfaces.

FREEMAN H. OWENS.